United States Patent Office 3,141,766
Patented July 21, 1964

3,141,766
TREATMENT OF PYROCHLORE
Alfred Richard Burkin, Shenfield, and Hugh David Sawyer, Wembley, England, assignors to National Research Development Corporation, London, England, a British corporation
No Drawing. Filed Oct. 13, 1961, Ser. No. 144,844
Claims priority, application Great Britain Oct. 17, 1960
8 Claims. (Cl. 75—114)

This invention relates to the treatment of pyrochlore and is particularly concerned with such treatment which enables the niobium and tantalum components of the ore to be obtained in solution, from which they can be separated by methods known per se.

Pyrochlore is a mineral of variable composition, and is principally calcium niobate with sodium, fluoride and hydroxide ions also present in the crystal lattice. In addition, tantalum is present in the ore, usually in low concentration. Commercially available pyrochlore is in general a concentrate containing not only the above components but also appreciable quantities of other minerals such as zircon and rutile associated with it in the deposit.

It is known that many mineral ores can be decomposed by fusing or sintering with an excess of alkalis such as sodium and potassium hydroxides and carbonates. For instance columbite (which is basically $FeO.Nb_2O_5$) can be decomposed by fusion with potassium hydroxide and the potassium niobate so formed dissolved in water. These fusion processes involve adding the ore to an excess of molten alkali and digesting the liquid mixture so formed, and in a successful fusion the metal components which it is desired to separate are rendered soluble in a practically useful reagent. Once in solution the metals can be readily separated from one another.

This fusion method is not a satisfactory one for pyrochlore. The molten products of fusion set on cooling to a hard cake which is very difficult to work with. The calcium present in pyrochlore leads to the products of fusion being insoluble in water, and dilute hydrochloric acid fails to dissolve the niobium- and tantalum-containing compounds. Strong hydrochloric acid may result in initial dissolving of the fusion products but the neutralisation of the alkali remaining after fusion can cause precipitation of sodium or potassium chloride, both of which are not very soluble in strong hydrochloric acid. Not only does this present solid separation problems, but also some of the niobium- and tantalum-containing compounds may be precipitated in the form of their chlorides at the same time. Another disadvantage of such a process is that sufficient hydrochloric acid must be added to the products of fusion to neutralise the alkali present therein and then make the solution strongly acid, and this is uneconomical.

It has now been discovered that pyrochlore can be satisfactorily cracked provided the roasting is carried out with a certain limited quantity of sodium or potassium hydroxide, that the product of such a roasting is a fairly friable solid far removed from the hard cake obtained after a conventional roasting process and that the niobium- and tantalum-containing compounds in the product of the roasting can be dissolved in strong hydrochloric acid. The niobium and tantalum, once present in solution, can be separated therefrom by techniques known per se, e.g. solvent extraction, precipitation and fractional hydrolysis.

According to the invention, therefore, there is provided a process for cracking pyrochlore by roasting with sodium or potassium hydroxide in which a sufficiently limited quantity of the alkali is used to be absorbed by the ore during roasting to form a mass of solid consistency and to leave substantially no excess of alkali in the liquid phase. By means of such a process, the product of roasting is obtained as a soft friable material which can be broken up into granular form. Provided the temperature and time of roasting is suitable, the niobium- and tantalum-containing compounds so formed can be dissolved in strong hydrochloric aicd. The stage of roasting at which the niobium and tantalum compounds are soluble in strong hydrochloric acid can be readily determined by simple experiment.

On roasting pyrochlore with a limited quantity of sodium or potassium hydroxide as defined above, the alkali first melts but is soon absorbed into the ore to form a solid mass. For complete cracking, the quantity of alkali used for the roasting should be sufficient to convert all the niobium and tantalum present in the pyrochlore under treatment to a form soluble in strong hydrochloric acid (which form is believed to be alkali niobate and tantalate), and is preferably not greatly in excess of this amount. Any such excess of alkali tends to lengthen the initial fusion stage of the roasting and if too large an excess is used, the roasting mixture remains molten from beginning to end of the roasting and this of course is contrary to the invention.

The quantity of alkali which is sufficient to cause complete cracking of the pyrochlore and yet lead to a roasting mass of solid consistency can be readily determined by simple experiments. It is difficult to quote a range of proportions of alkali which are suitable, as samples of pyrochlore vary enormously according to their source not only as regards the proportion of niobium and tantalum contained therein but also as regards the proportions of other constituents and impurities likely to complete for the alkali added. In general, however, a quantity of sodium hydroxide appreciably more than sufficient to satisfy the requirements of the constituents and impurities of the mixture other than niobium and tantalum plus the stoichiometric quantity sufficient to form the compounds $Na_{10}Nb_4O_{15}$ and $Na_{10}Ta_4O_{15}$, and not more than three times this amount has been found suitable. An equivalently greater quantity of potassium hydroxide would be suitable. A preferred quantity is that falling within the above range which is 1½ times that sufficient to form $Na_{10}Nb_4O_{15}$ and $Na_{10}Ta_4O_{15}$. It should be understood that $Na_{10}Nb_4O_{15}$ and $Na_{10}Ta_4O_{15}$ are not necessarily the compounds formed as a result of the process and that the above is only intended as an empirical guide to the quantity of alkali that may be used. If the analysis of a particular sample of pyrochlore is known, and the quantity of alkali likely to react with a given quantity of the constituents and impurities of the sample is also known, then the preferred weight of alkali can be calculated rather than determined by experiment. For instance, using the sample of pyrochlore for which an analysis is quoted in Example 1, an allowance would have to be made for the presence of titanium and zirconium oxides and some of the rare earths.

The roasting process is preferably carried out using sodium hydroxide, as potassium hydroxide gives harder products than sodium hydroxide for equivalent conditions of alkali/pyrochlore ratio and temperature. In the case of one particular specimen of pyrochlore, 6 gms. of sodium hydroxide was insufficient to decompose the whole of 10 gms. of pyrochlore, 7.25 gms. was almost sufficient and the optimum weight of sodium hydroxide was 7.6 gms. These figures, however, apply directly only to one particular sample of pyrochlore and are not accurate for all samples. In general, however, the pyrochlore should constitute more than 50% of the weight of the mixture when sodium hydroxide is used.

It is advantageous in carrying out the process to have a little water present at the beginning of the roasting of the ore. This water is driven off by heating at a relatively low temperature before the roasting proper is begun. It is believed that as the water is driven off it leads to good mixing of the mineral with the molten alkali. Care must be taken, however, that too much water is not present, as this leads to undesirable alkali fumes being formed. In general sufficient water is present if the sodium or potassium hydroxide to be used in the roasting is first left in contact with the atmosphere for a time before use so that it absorbs a certain amount of water. Alternatively the molten alkali and ore may be mixed mechanically before the roasting proper begins.

The temperature at which the roasting of the ore with potassium or sodium hydroxide is carried out should in general be above 350° C. and preferably above 400° C. The higher the temperature, however, the less hard the product and it has been found that at 650° C., the product is fairly friable and the reaction is reasonably fast. At 800° C. a very good material is obtained and above this temperature no upper limit above which the reaction will not take place satisfactorily has been found. Thus, on cracking at 1,200° C., the products of the cracking process dissolve quite well in acid. As to the length of time for which roasting is carried out, this depends upon the temperature used for the roasting. In general it may be convenient to roast for a limited period at a low temperature e.g. in the range of 350° C. to 500° C. and then complete the roasting at a higher temperature e.g. above 500° C. One successful process involves roasting at 400° C. for 3½ hours followed by half-an-hour at 800° C.

After roasting, the niobium (in the form of its alkali metal niobate) and the tantalum (in the form of its alkali metal tantalate) can be dissolved in strong hydrochloric acid. The acid strength used should in general be at least 5 N, lower acid strengths leading to reduced quantities of niobium and tantalum dissolving in the acid. One convenient method for dissolving the product of the roasting process is to add it to boiling hydrochloric acid, when the soluble parts thereof rapidly dissolve. Some of the dissolved material tends to precipitate back out of solution, but addition of water is generally sufficient to make any precipitated solid redissolve. The resultant solution contains substantially all the niobium and tantalum compounds, and is usually perfectly clear, apart from any original solid which did not dissolve and is stable. One advantage of the process of the invention is that, with many samples of pyrochlore, the amount of this original solid insoluble in the hydrochloric acid is very small. This enables a very efficient extraction process to be carried out without any serious solid separation problems. Mineral acids other than hydrochloric acid have been found to be unsatisfactory. Thus sulphuric and hydrofluoric acids give large amounts of insoluble residue (probably due to the formation of calcium sulphate and fluoride respectively) so that even if all the niobium and tantalum can be obtained in solution there is a serious solid separation problem, and nitric acid dissolves little of the niobium and tantalum.

It is advantageous in some cases to add certain salts to the roast, these salts tending to make the products of roasting more soluble in hydrochloric acid and to make it possible to achieve complete conversion of the niobium present to alkali niobate under less vigorous conditions (i.e. roasting at a lower temperature for the same time or at the same temperature for a shorter time than would otherwise be necessary). Useful salts in this respect have been found to be calcium salts (such as chalk or lime) and alkali metal chlorides, and particularly calcium chloride and sodium chloride.

The following examples illustrate the invention:

EXAMPLE 1

10 g. of pyrochlore was added to 3.6 g. of potassium hydroxide in a nickel crucible and placed in a furnace at 600° C. for 4 hours. When treated with concentrated hydrochloric acid by the standard method (see below) the product gave a residue of brown and white particles. Not all of the pyrochlore had been decomposed.

Wt. of residue from 0.5 g.=0.2148 g.

The pyrochlore used in this example, and all following examples, was from Uganda and had been separated by conventional mineral processing methods. It was rather impure as can be seen by comparing the analyses of the mineralogically pure pyrochlore and the sample used.

|  | Pure pyrochlore | Sample used |
|---|---|---|
| $Nb_2O_5$ | 68.72 | 52.0 |
| $Ta_2O_5$ | 0.20 |  |
| $Na_2O$ | 7.24 |  |
| F | 3.87 |  |
| $TiO_2$ | 0.56 | 12.9 |
| CaO | 14.82 |  |
| $ZrO_2$ | 1.91 | 1.9 |
| $ThO_2$ | 0.37 |  |
| Rare earths | 2.0 |  |
| $P_2O_5$ |  | 0.2 |
| $Fe_2$ |  | 8.2 |

*Standard Method of Dissolving Roasted Products in Hydrochloric Acid*

When the solid is dropped into boiling concentrated hydrochloric acid it dissolves quite rapidly and then solid comes out of solution. This redissolves on adding sufficient, but not too much, water. The resulting solution is perfectly clear, apart from any original solid which did not dissolve, and is stable. That is, there is no colloidally dispersed niobium pentoxide visible.

For comparative purposes the following method was used. The weighed sample of solid, usually 0.5 g. is dropped into 50 cc. of boiling hydrochloric acid and boiled for 2 mins. 50 cc. of cold water is added, the liquid heated to boiling and boiled for 1 minute. After allowing the solution to cool for 2 hours it is filtered (Whatman No. 541 paper), the residue and paper washed with cold water and ignited in a silica crucible over a Bunsen burner. Finally the residue in the crucible is heated for 15 minutes over a Meker burner and weighed.

EXAMPLE 2

The experiment was repeated using 10 g. of pyrochlore and 7.25 g. of potassium hydroxide. After treatment with concentrated hydrochloric acid by the standard method the residue was cream in colour and contained no pyrochlore.

Wt. of residue from 0.5 g.=0.0959 g.

EXAMPLE 3

The experiment was repeated using 10 g. of pyrochlore and 14.5 g. of potassium hydroxide. After treatment with concentrated hydrochloric acid by the standard method the residue was white.

Wt. of residue from 0.5 g.=0.0131 g.

EXAMPLE 4

10 g. of pyrochlore were added to 3.6 g. of sodium hydroxide in a nickel crucible and placed in a furnace at 600° for 4 hours. The product contained much unchanged pyrochlore and was not examined further.

Wt. of residue from 0.5 g.=0.2099.

EXAMPLE 5

Experiment 4 was repeated using 1.25 g. of sodium hydroxide. After treatment with concentrated hydrochloric acid by the standard method the residue was white and contained no unchanged pyrochlore.

Wt. of residue from 0.5 g.=0.0266 g.

EXAMPLE 6

Experiment 4 was repeated using 14.5 g. of sodium hydroxide. After treatment with concentrated hydrochloric acid by the standard method the residue was white. Wt. of residue from 0.5 g.=0.0044 g.

EXAMPLE 7

5 g. of pyrochlore was added to 5 g. of sodium hydroxide dissolved in 8.3 cc. of water, contained in a nickel crucible. The water was driven off carefully at as low a temperature as practicable, the paste being stirred occasionally. The mixture was put into a furnace at 400° C. and kept at that temperature for 3½ hours. It was examined, replaced in the furnace and the temperature raised to 800° C. over a period of 2 hours. The mixture was examined and replaced the temperature reaching 850° after another ½ hour. The product became more crumbly as the temperature was raised and broke up very easily at the end of the experiment. 0.5 g. of the product dissolved in 90% hydrochloric acid by the standard technique gave 0.0032 g. of residue.

EXAMPLE 8

Experiment 7 was repeated using 7 g. of potassium hydroxide instead of the 5 g. of sodium hydroxide. The product of roasting was hard and difficult to break up. The pyrochlore had been completely decomposed.

EXAMPLE 9

20 g. of pyrochlore was added to 14.5 g. of sodium hydroxide dissolved in water to give 33.3 cc. of solution. The mixture, in a nickel crucible, was dried with occasional stirring, put into a furnace and the temperature slowly raised to 600°. The product was not as easy to break up as that obtained in Experiment 7. 0.5 g. of the product dissolved in 100% hydrochloric acid by the standard technique gave 0.0396 g. of residue.

EXAMPLE 10

10 g. of pyrochlore and 6 g. of sodium hydroxide were kept in a nickel crucible in a furnace at 600° for 3½ hours, the temperature being allowed to reach 700° over another ½ hour. Loss of weight during roasting: 1.4 g. 0.4 g. of the product dissolved in 100% hydrochloric acid by the standard technique gave 0.0474 g. of residue which was largely pyrochlore.

EXAMPLE 11

Experiment 10 was repeated using 7.25 g. of sodium hydroxide. Loss of weight: 1.45 g. 0.5 g. of product dissolved in 100% hydrochloric acid by the standard technique gave 0.0271 g. of residue.

EXAMPLE 12

Experiment 10 was repeated using 8 g. of sodium hydroxide. Loss of weight: 1.3 g. 0.5 g. of product dissolved in 100% hydrochloric acid by the standard technique gave 0.0295 g. of residue.

EXAMPLE 13

The product of roasting in Experiment 11 was boiled for 2 minutes or for one minute in various concentrations of hydrochloric acid, other conditions being kept to the standard method. Acid strength is given as percentage of concentrated acid (about 10.5 N), thus 80% acid is made by diluting 80 cc. of concentrated acid with water to give 100 cc. of solution. The weights of residue were as follows:

| Acid strength, percent | 100 | 90 | 80 | 70 | 65 | 60 |
|---|---|---|---|---|---|---|
| 2 mins. boiling, residue (g.) | 0.0271 | 0.0249 | 0.0251 | 0.0250 | 0.0293 | 0.0311 |
| 1 min. boiling, residue (g.) | 0.0287 | 0.0230 | 0.0260 | 0.0282 | 0.0313 | |

EXAMPLE 14

10 g. of pyrochlore and 7.6 g. of sodium hydroxide were heated in a nickel crucible at 800° for 1 hour. The product was very crumbly and broke up very easily. 0.5 g. of product dissolved in 90% hydrochloric acid by the standard technique (boiling with acid for 1 minute) gave 0.0019 g. of residue. 1.0 g. of product gave 0.0037 g. of residue. 2.0 g. gave 0.056 g.

EXAMPLE 15

Experiment 14 was repeated, the material being kept at 800° for 2 hours. 0.5 g. of product dissolved in 90% hydrochloric acid by the standard technique (boiling with acid for 1 minute) gave 0.0084 g. of residue.

EXAMPLE 16

2.5 g. of niobium pentoxide were mixed in a nickel crucible with 3.5 g. sodium hydroxide dissolved in 7 cc. of water. The water was driven off at a low temperature and the crucible heated at 700° for 2 hours.

(A) The experiment was repeated with the following materials added to the water in which the hydroxide was dissolved:

(B) 2.1 g. of anhydrous calcium chloride.
(C) 0.63 g. of sodium chloride.
(D) 0.36 g. of manganous sulphate tetrahydrate.

A quantity of each roasted product was treated with 90% hydrochloric acid by the standard method and the weights of residues were as follows:

| Product | A | B | C | D |
|---|---|---|---|---|
| Weight taken g | 0.173 | 0.232 | 0.189 | 0.184 |
| Weight of residue g | 0.0135 | 0.0059 | 0.0104 | 0.0183 |

All solutions were cloudy except that obtained from B. The cloudiness indicates a finely divided form of metal oxide which is very undesirable.

We claim:

1. A process for extracting niobium in pyrochlore which comprises roasting pyrochlore in admixture with an alkali selected from the group consisting of sodium hydroxide and potassium hydroxide at a temperature of at least 350° C., the quantity of alkali employed being sufficient to react with all niobium in the pyrochlore but not in excess of that which the pyrochlore can absorb during the roasting operation and such roasting operation only being terminated when substantially no separate molten alkali phase is present, treating the roasted mass with hydrochloric acid of a strength of at least 5 N to produce a solution of niobium values and separating the solution of niobium values from the undissolved residue.

2. A process according to claim 1 in which the amount of alkali employed is one to three times the amount required to convert the niobium present in the pyrochlore to the empirical compound $Me_{10}Nb_4O_{15}$ wherein Me is selected from the group consisting of sodium and potassium.

3. A process according to claim 2 in which the alkali admixed with the pyrochlore to be roasted contains a small proportion of water, which on evaporation improves the mixing of the pyrochlore and alkali.

4. A process according to claim 2 in which the roasted mass is treated with boiling hydrochloric acid and any precipitate which forms is re-dissolved by addition of water to the solution before separating the solution of niobium values from the undissolved residue.

5. A process according to claim 2 in which the roasting is effected in a first stage at 350–500° C. and in a subsequent stage at a temperature above 500° C.

6. A process according to claim 2 in which a substance selected from the group consisting of calcium and calcium chloride is present in the mixture roasted.

7. A process according to claim 2 in which an alkali metal chloride is present in the mixture roasted.

8. A process for extracting niobium in pyrochlore which comprises roasting pyrochlore in admixture with an alkali selected from the group consisting of sodium hydroxide and potassium hydroxide at a temperature of at least 350° C., the quantity of alkali employed being sufficient to react wtih at least a substantial proportion of the niobium in the pyrochlore but not in excess of that which the pyrochlore can absorb during the roasting operation and such roasting operation only being terminated when substantially no separate molten alkali phase is present and treating the roasted mass with hydrochloric acid of a strength of at least 5 N to produce a solution of niobium values and separating the solution of niobium values from the undissolved residue.

References Cited in the file of this patent
UNITED STATES PATENTS 2,953,453     Foos _____ Sept. 20, 1960
2,956,857     Fuhoff et al. _____ Oct. 18, 1960

OTHER REFERENCES

Pierret et al.: "Caustic Fusion of Columbite-Tantalite Concentrates With Subsequent Separation of Niobium and Tantalum," ISC–796, AEC Research and Development Report, August 1956, pp. 4–6, 13 and 14.